United States Patent [19]
Emmons et al.

[11] Patent Number: 5,305,405
[45] Date of Patent: Apr. 19, 1994

[54] PATCH CORD

[75] Inventors: David J. Emmons, Plymouth; Liang-Ju Lu, Eden Prairie; James W. Conroy, Prior Lake; George B. Pfeffer, Minnetonka, all of Minn.

[73] Assignee: ADC Telecommunications, Inc., Minneapolis, Minn.

[21] Appl. No.: 17,156

[22] Filed: Feb. 25, 1993

[51] Int. Cl.⁵ .............................................. G02B 6/36
[52] U.S. Cl. ........................................ 385/73; 385/76; 385/901; 385/100
[58] Field of Search ............... 385/76, 902, 100, 901, 385/73, 101, 53, 115, 117, 102, 103, 134, 147

[56] References Cited

U.S. PATENT DOCUMENTS

| | | | |
|---|---|---|---|
| 4,653,848 | 3/1987 | Kloots | 385/76 |
| 4,707,073 | 11/1987 | Kocher | 385/902 |
| 4,887,190 | 12/1989 | Sadamune et al. | 385/901 |
| 4,978,194 | 12/1990 | Allen et al. | 385/76 |
| 5,228,109 | 7/1993 | Fujii et al. | 385/76 |

Primary Examiner—Rodney B. Bovernick
Assistant Examiner—John Ngo
Attorney, Agent, or Firm—Merchant, Gould, Smith, Edell, Welter & Schmidt

[57] ABSTRACT

A patch cord includes a cable having a primary transmission member contained within a protective sheathing. An energy transmission member is carried on the cable and extends from a first end to a second end. First and second couplings are connected to the first and second ends of the energy transmission member. The first coupling receives energy from an external source and transmits the energy along the energy transmission member toward the second coupling. The second coupling receives energy from the energy transmission member and generates a visible signal in response to the received energy.

29 Claims, 13 Drawing Sheets

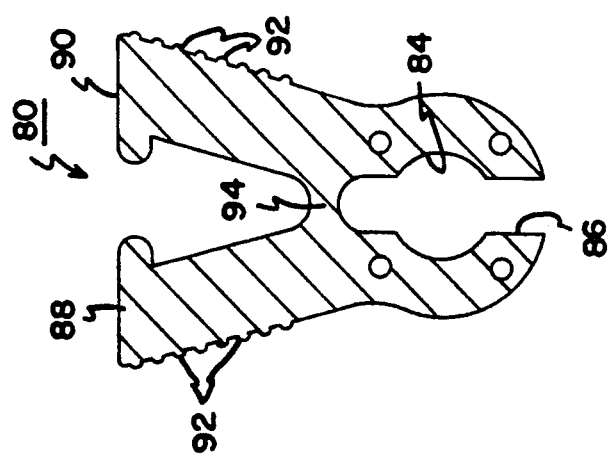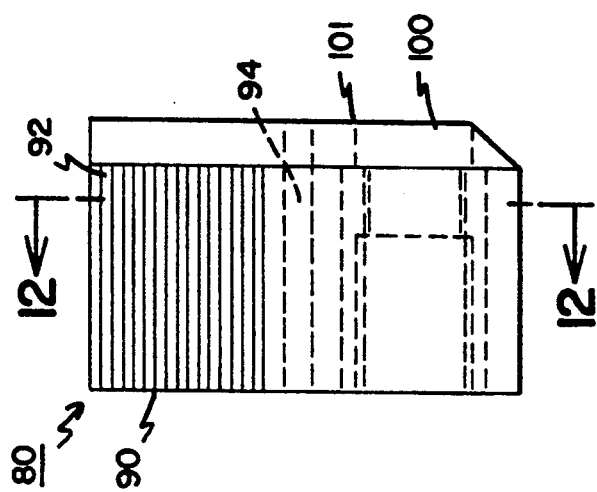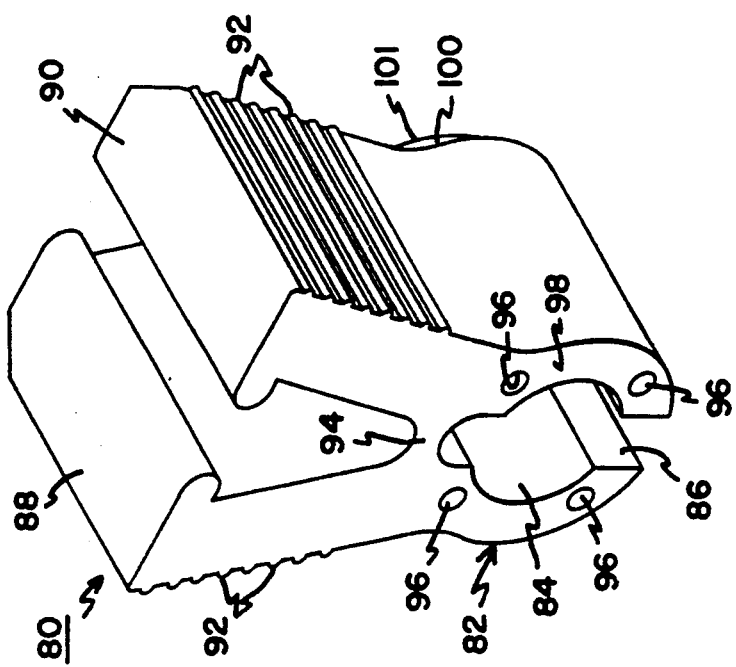

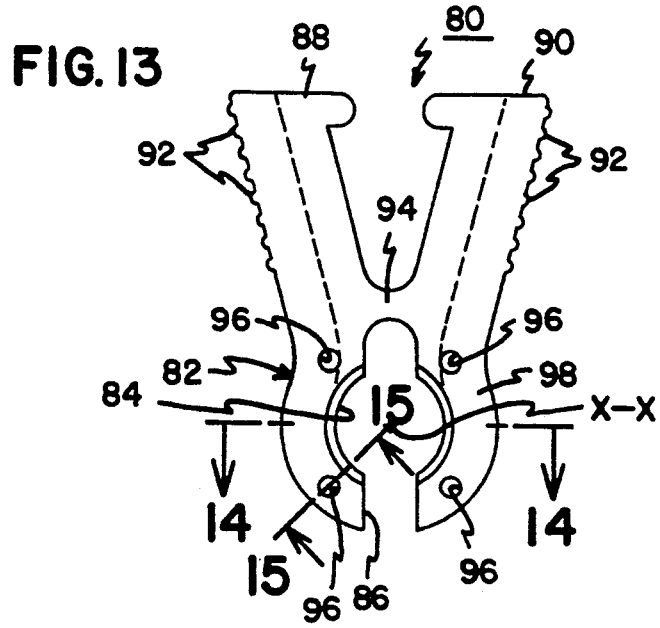
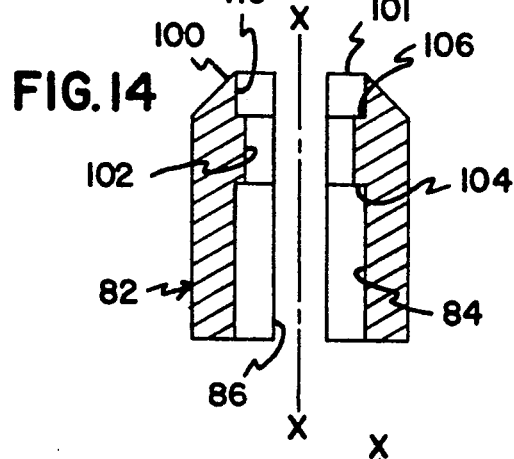
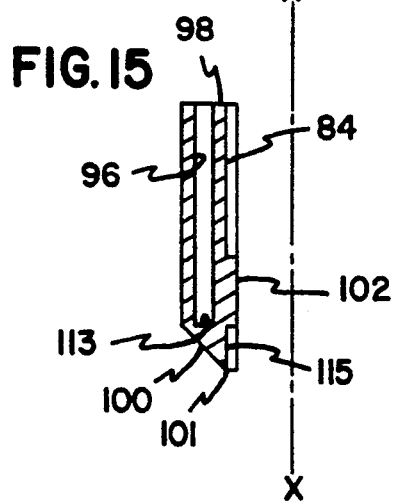

PATCH CORD

I. BACKGROUND OF THE INVENTION

1. FIELD OF THE INVENTION

This invention pertains to patch cords for the telecommunications industry. More particularly, this invention pertains to a patch cord which carries means for providing a visual indicator.

2. DESCRIPTION OF THE PRIOR ART

In the telecommunications industry, patch cords are widely used to connect various pieces of equipment. For example, in well-known cross-connect applications, a patch cord may be used to extend between two jack fields. For DS-3 signal rates, patch cords made of coaxial cables are used. The ends of the patch cords are provided with plugs which are received within jacks contained in the two jack fields.

Frequently, telecommunications facilities (such as central office locations) will have a large number of patch cords extending between various pieces of equipment. In order to avoid confusion and undesirable interruption of signal flows, a technician must determine quickly and accurately the two pieces of equipment which are connected by a single patch cord. To this end, tracer lamps have been used in the past.

Commonly, a tracer lamp system includes two flashing or non-flashing LED's each physically attached to the two pieces of equipment being connected by the patch cord. The patch cord commonly carries an extra conductor or pair of conductors terminating at pins on opposite ends of the patch cord. The equipment being connected would have pin jacks for receiving the pins. Accordingly, the plugs of the coaxial cable are inserted within jacks contained in the two jack fields. The tracer lamp pins are then inserted into the pin jacks associated with the two jack fields. Upon activation of a switch, LED's on each of the two pieces of equipment are illuminated with the LED's being connected by the extra conductor carried on the coaxial cable.

From the foregoing, the reader will appreciate that patch cords with tracer lamp capabilities require tracer lamps to be available on the equipment to be connected. Also, such equipment must have pin jacks for receiving the pins. However, not all telecommunications jack fields are provided with installed tracer lamps. Instead, such tracer lamps are frequently provided as an option. Therefore, it is not uncommon for a telecommunications facility to have an installed jack field which does not have tracer lamps.

While the absence of tracer lamps may be acceptable in a small installation, as an installation grows the absence of the tracer lamps becomes undesirable. Unfortunately, if patch cords with tracer capabilities are desired at a later date, the hardware must be replaced with hardware having tracer lamps installed.

The problem of existing hardware not having tracer lamp capabilities is particularly acute for fiber optic installations. In fiber optic installations, a fiber optic patch cord is used extending between fiber optic connectors. Typically, fiber optic installations do not include tracer lamp capabilities installed within the hardware. As the use of fiber optic patch cord increases, the need for tracer lamp capability has increased. The adverse consequences of disconnecting the wrong patch cord is particularly acute in a fiber optic installation since extremely high transmission rate speeds are used in fiber optic installations.

It is an object of the present invention to provide a patch cord having tracer functions. Further, it is an object of the present invention to provide a tracing patch cord which does not require pre-existing hardware having tracer lamp capabilities.

II. SUMMARY OF THE INVENTION

According to a preferred embodiment of the present invention, a patch cord is provided having a transmission element extending from a first cable end to a second cable end. An energy transmission element is carried on the cable and extends from a first end approximate the first cable end to a second end approximate the second cable end. A first connector is secured to the first cable end and a second connector is secured to the second cable end. First and second couplings are connected to the first end and the second end, respectively, of the energy transmission member. The first coupling includes means for receiving energy from an external source and transmitting the energy along the energy transmission member to the second coupling. The second coupling includes second means for receiving the energy from the energy transmission member and generating a visible signal in response to receiving the energy.

III. BRIEF DESCRIPTION OF THE DRAWINGS

FIG. 10 is a perspective view of a power clip for use with the present invention;

FIG. 11 is a side elevation view of the clip of FIG. 10;

FIG. 12 is a view taken along line 12—12 of FIG. 11;

FIG. 13 is an end view of the clip of FIG. 10;

FIG. 14 is a view taken along line 14—14 of FIG. 13;

FIG. 15 is a view taken along line 15—15 of FIG. 13;

IV. DESCRIPTION OF THE PREFERRED EMBODIMENT

Referring now to the several drawing Figures in which identical elements are identically throughout, a description of the preferred embodiment will now be provided. When considering the preferred embodiment, the reader will note that the invention is described with reference to a fiber optic patch cord having a second transmission element in the form of an additional optical fiber. While this is the preferred embodiment of the present invention, those skilled in the art will appreciate that the teachings of the present invention can be applied to patch cords other than fiber optic patch cords (for example, coaxial cables for use in DS-3 transmission rate speeds). Also, energy transmission members other than the secondary optical fiber utilized in the preferred embodiment could be used. An example of an alternative energy transmission member is copper wire or the like.

Figure 1:
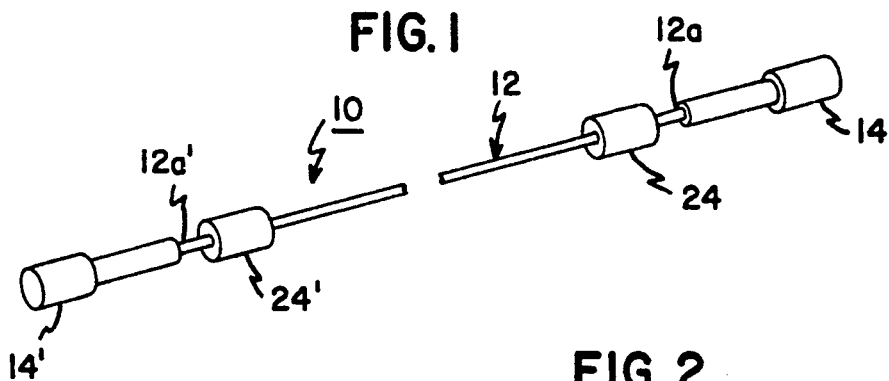
FIG. 1 is a perspective schematic of a patch cord according to the present invention.

With initial reference to FIG. 1, a patch cord 10 according to the present invention is shown in schematic view for purposes of illustration. The patch cord 10 includes a cable 12 extending from a first end 12a to a second end 12a'. Connectors 14, 14' are connected to the cable 12 at ends 12a, 12a', respectively. For use with an optical fiber cable 12, the connectors 14, 14' may be any well-known fiber optic connectors such as so-called SC, FC, or D4 connectors or the like. For use with coaxial cable patch cords, the connectors 14, 14' would be well-known coaxial plugs.

Normally, optical fiber cables consist of a centrally positioned optical fiber surrounded by strengthening material (such as Kevlar fibers) together with an outer sheathing. The fiber is commonly buffered. The cable 12 of the present invention utilizes an additional fiber 22 as best shown with reference to FIGS. 2 and 3. Fiber 22 need not be a telecommunications transmission quality fiber. Instead, any waveguide for carrying light is suitable.

Figure 3:
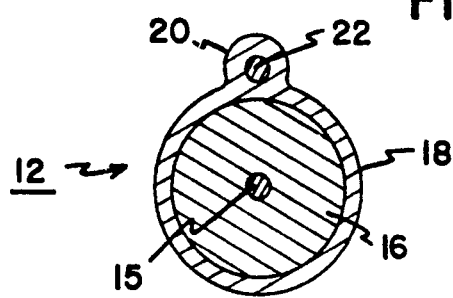
FIG. 3 is a cross-sectional view of a second embodiment of a cable of the patch cord.
Figure 16:
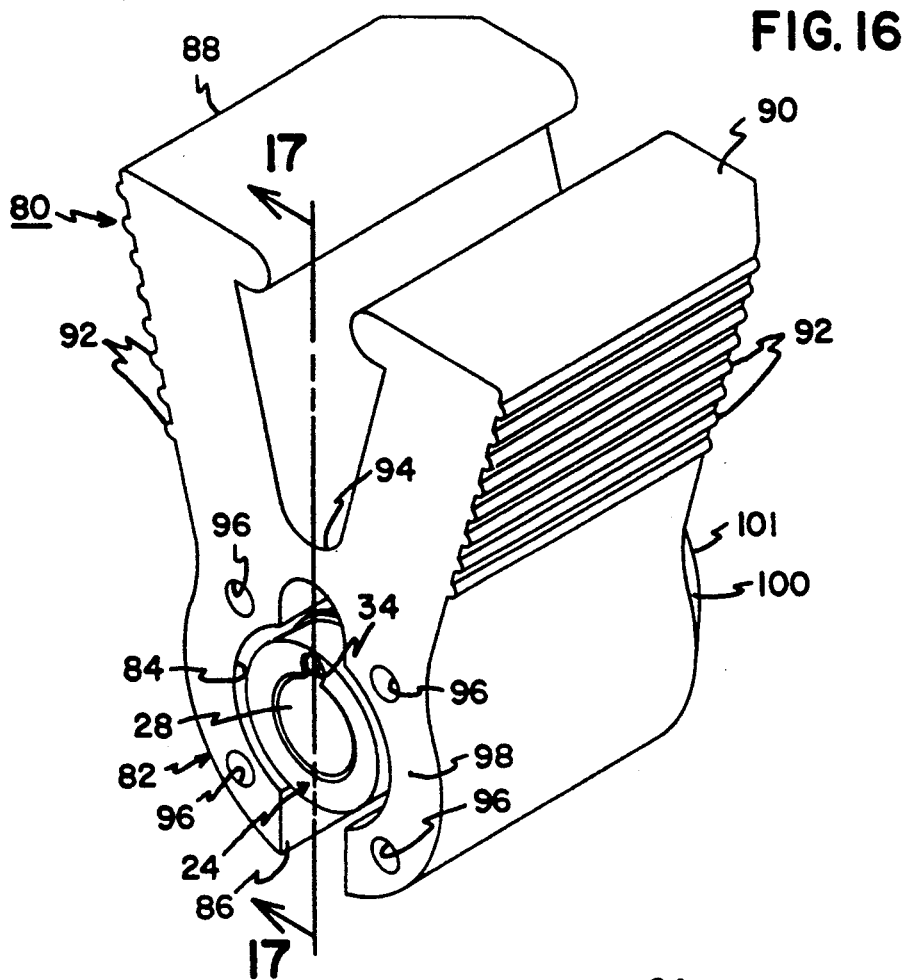
FIG. 16 is a perspective view showing the clip of FIG. 10 connected onto the coupling of FIG. 4.
Figure 4:
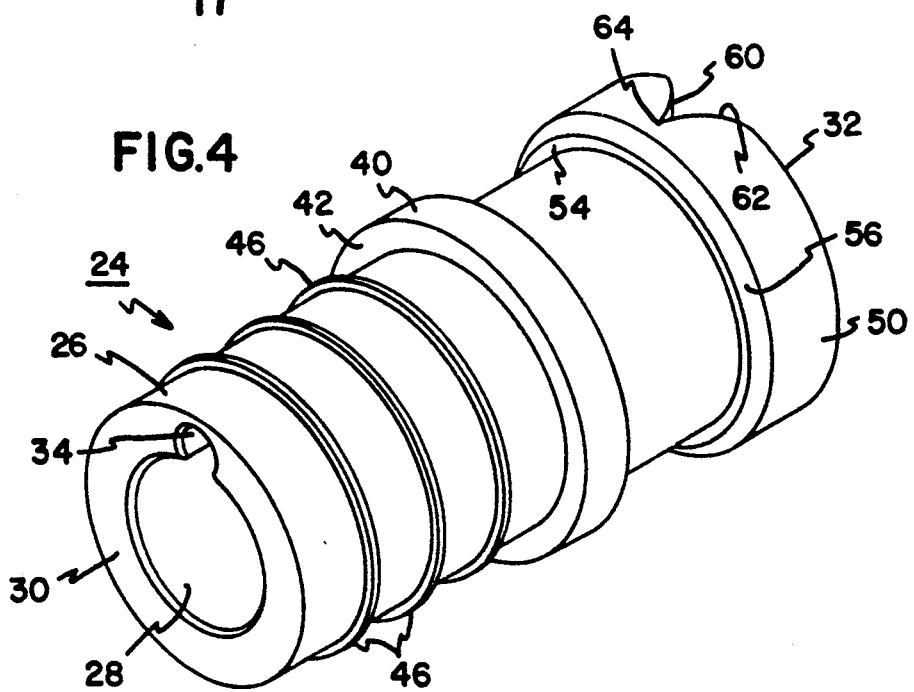
FIG. 4 is a perspective view of a coupling for use with the present invention.

With initial reference to FIG. 3, one preferred structure of the cable 12 is shown in cross-section. The cable 12 includes a primary transmission member in the form of an optical fiber 14. A strengthening member such as Kevlar fibers 16 surround the fiber 14. A protective sheathing 18 surrounds the Kevlar fibers 16. The sheathing 18 includes a raised area 20 on a side of the cable 12 and extending the length of the cable 12. The sheathing 20 surrounds a secondary transmission member 22 which, in a preferred embodiment, is an optical waveguide such as an optical fiber.

Figure 2:
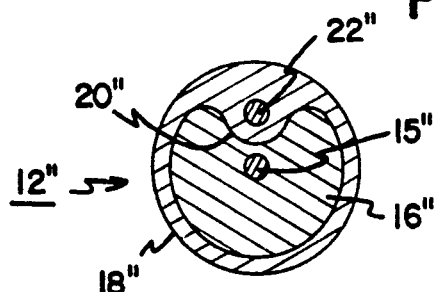
FIG. 2 is a cross-sectional view of one embodiment of a cable of the patch cord.

FIG. 2 shows an alternative embodiment of the cable 12. In FIG. 2 a cable 12" is shown having a centrally positioned primary transmission member in the form of an optical fiber 14". Kevlar fibers 16" surround fiber 14". Instead of a raised area 20 as shown in FIG. 3, the sheathing 18" includes a recessed area 20" which is provided with a secondary optical fiber 22" contained in area 20".

It will be appreciated by those skilled in the art that FIGS. 2 and 3 are merely illustrative of the various techniques by which a secondary optical fiber 22 may be carried on a fiber optic cable. For example, the secondary fiber 22 could simply be housed in a separate sheathing which is physically secured to the cable 12 through any suitable means such as tape, adhesive or the like. Additional alternative embodiments are shown in FIGS. 22-27 and 27A discussed later in this application.

The secondary optical fiber 22 terminates at first and second ends. Only first end 22a is shown in the drawings (for example FIG. 9). However, the first and second ends are identical and a description of one will suffice as a description of the other.

Connected to the first and second ends of the secondary fiber 22 are first and second couplings 24, 24'. Each of the couplings are identical and secured to the secondary fiber 22 in the cable 12 in an identical manner. Accordingly, a description of coupling 24 will suffice as a description of coupling 24'.

With reference now directed to FIGS. 4-8, the coupling 24 will be described in detail. The coupling 24 is formed of clear injection molded plastic such as polycarbonate or acrylic.

The coupling 24 includes a generally cylindrical body 26. The body 26 surrounds a coaxially disposed bore 28 extending through the length of the body 26 with the bore 28 having a diameter sized to pass the diameter of the main sheathing 18 of the cable 12 shown in FIG. 3. The body 26 extends from a first end 30 to a second end 32.

Figure 6:
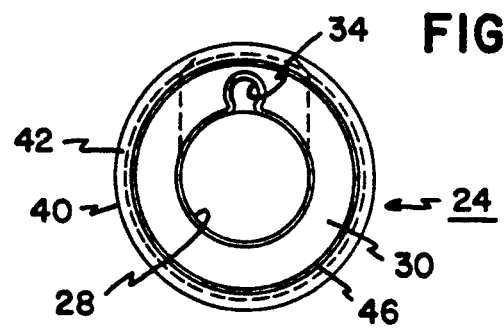
FIG. 6 is an end view of the coupling of FIG. 4.
Figure 8:
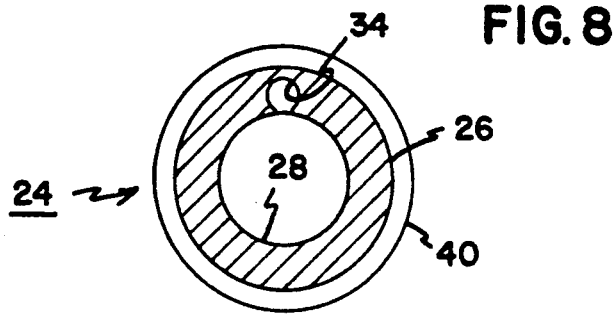
FIG. 8 is a cross-sectional view of the coupling of FIG. 4 taken along line 8—8.

A secondary bore 34 extends partially through the body 26 and is exposed through end 30. The bore 34 terminates at a flat face 66 perpendicular to the axis of bore 34. Bore 34 is positioned running parallel to bore 38 with bore 34 disposed on a side of bore 28 and in communication therewith as best shown in FIGS. 6 and 8. Bore 34 is sized to receive the secondary optical fiber 22.

A locating flange 40 surrounds body 26 between ends 30, 32. The flange 40 has a flat radial surface 42 facing end 30 and flat radial surface 44 facing end 32. A plurality of annular ribs 46 surround body 26 between end 30 and surface 42 with the ribs 46 having an outside diameter less than the outside diameter of the flange 40.

Intricately formed on end 32 is an annular ring 50. The ring 50 has a circumferential face 52 and a flat radial face 54 opposing surface 44. A beveled surface 56 connects surfaces 54 and 52. Further, end 32 is flat with a beveled surface 58 connecting surfaces 32, 52.

Figure 5:
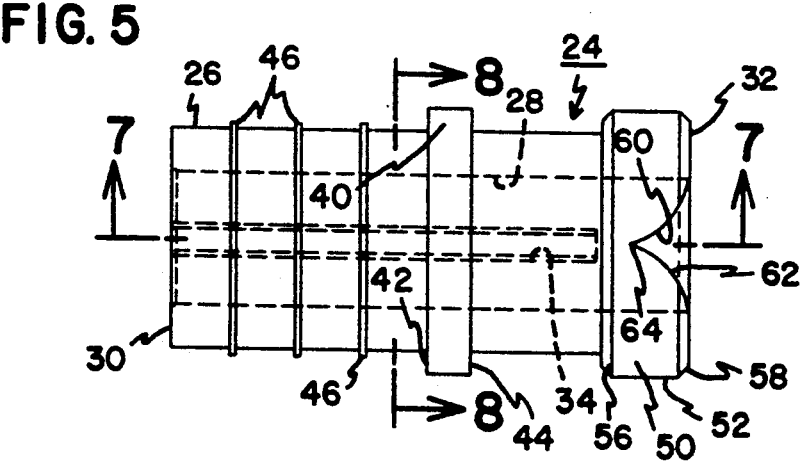
FIG. 5 is a side elevation view of the coupling of FIG. 4.
Figure 7:
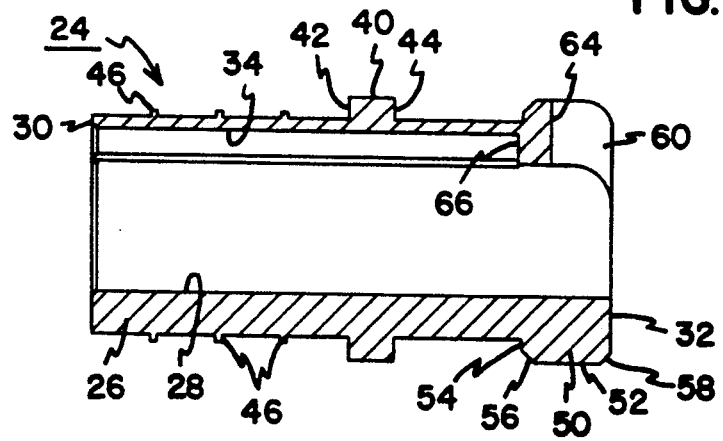
FIG. 7 is a view taken along line 7—7 of FIG. 5.

Best shown in FIG. 5, the ring 50 is provided with a V-shaped cutout defined by a first arcuate reflective surface 60 and a second arcuate reflective surface 62 which meet at an apex 64 disposed in alignment with the axis of bore 34. As shown in FIG. 7, bore 34 terminates at a flat surface 66 which is parallel to and spaced from apex 64 by the material of ring 50.

In a preferred embodiment, coupling 24 is a solid piece of light transparent plastic. As a result, when light is directed toward surface 66, the light passes through the material of the ring 50 and hits apex 64 and arcuate surfaces 60, 62. The light reflects off the arcuate surfaces 60, 62 and into the ring 50. The circumferential surface 52 as well as the beveled surfaces 56, 58 all provide light reflecting or refracting surfaces such that the light is then directed throughout the ring and illuminates the ring 50.

Figure 9:
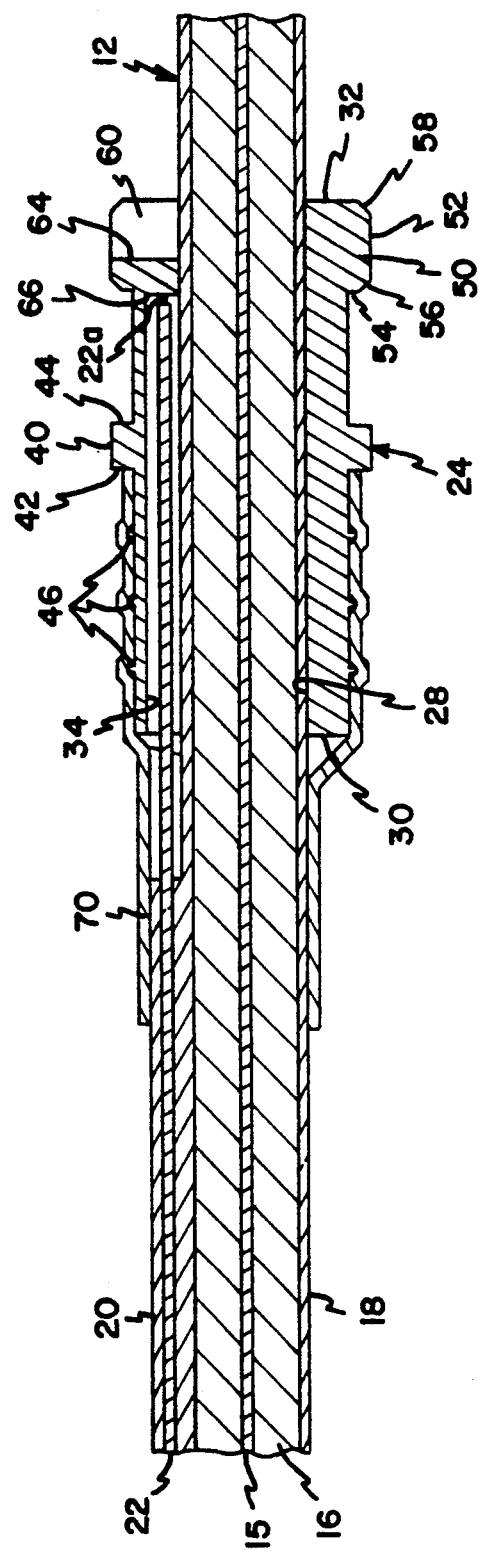
FIG. 9 is a cross-sectional view of the coupling of FIG. 4 assembled with a cable.

FIG. 9 shows assembly of the coupling 24 onto the cable 12. As shown, the cable 12 is stripped to expose a length of secondary fiber 22 sufficient to be received within bore 34. The coupling 24 is passed on to cable 12 with sheathing 18 and fiber 14 extending through bore 28. The free end 22a of fiber 22 is passed into bore 34 until the free end 22a opposes and abuts surface 66. (In FIG. 9, the sizing of a gap between end 22a and surface 66 is shown exaggerated as is the relative sizing between bore 34 and fiber 22). A shrink-wrap sleeve 70 is passed over the cable 12 and is stopped against surface 42. Through applying heat, the sleeve 70 shrinks to be securely received on the cable 12 and securely received on the body 26. To ensure that the shrink-wrap sleeve 70 is fastened to body 26, the ribs 46 are provided giving secure attachment of the coupling 24 to the cable 12. With the assembly shown in FIG. 9, illumination of the secondary transmission fiber 22 causes light to pass axially from the fiber 22 through end 22a and pass through surface 66 resulting in illumination of ring 50.

The structure thus described illustrates the attachment of couplings 24, 24' to the cable 12 at opposite ends of the cable 12. Preferably, the couplings 24, 24' are placed as close as possible to connectors 14, 14'.

The foregoing description describes how a ring 50 is illuminated by reason of illumination of the fiber 22. However, the foregoing description does not describe how fiber 22 becomes illuminated. To this end, a power source clip 80 is provided. In a preferred embodiment, clip 80 is formed of the same light transparent plastic material as that of coupling 24.

Shown best in FIGS. 10-15, the clip 80 includes a cylindrical body 82 having a bore 84 sized to receive the body 26 of coupling 24. An axial slot 86 extends through the body 82 in communication with bore 84. On a side of the body 82 opposite slot 86, lever arms 88 and 90 are provided. Each of arms 88 includes ribs 92 to permit a technician to securely grasp the levers 88, 90 and force the levers 88, 90 toward one another resulting in enlargement of the bore 84. Thereby, the slot 86 opens to permit placement of the clip 80 on either coupling 24 or 24'. The ribs 88, 90 are joined at a fulcrum point 94.

The body 82 also includes a plurality of secondary bores 96 extending partially through the body from a first end 98 toward a second end 101. The bores 96 are sized to receive source optical fibers (only one of which is shown as fiber 110 in FIG. 19).

As best shown in FIGS. 14 and 15, the bore 84 is provided with an interior ring 102 extending between first and second flat annular surfaces 104, 106. The ring 102 is sized to be received between surfaces 44 and 54 of coupling 24. Also, the end 101 of the body is provided with a 45° chamfer 100 (measured with respect to the axis X—X). The purpose of the chamfer 100 will become apparent with reference to FIG. 15. Namely, fiber 110 is placed within bore 96 with the end 112 of the fiber 110 opposing surface 113. Since the chamfer 100 is at a 45° angle to surface 113, light exiting from end 112 passes through surface 113 and reflects off the chamfer 100 radially toward the axis X—X. The ring 102 separates bore 84 to define groove 115 sized to receive ring 50 with surface 52 opposing chamfer 100. A groove 117 is formed on an opposite side of ring 102. Groove 117 is sized to receive flange 40.

Figure 19:
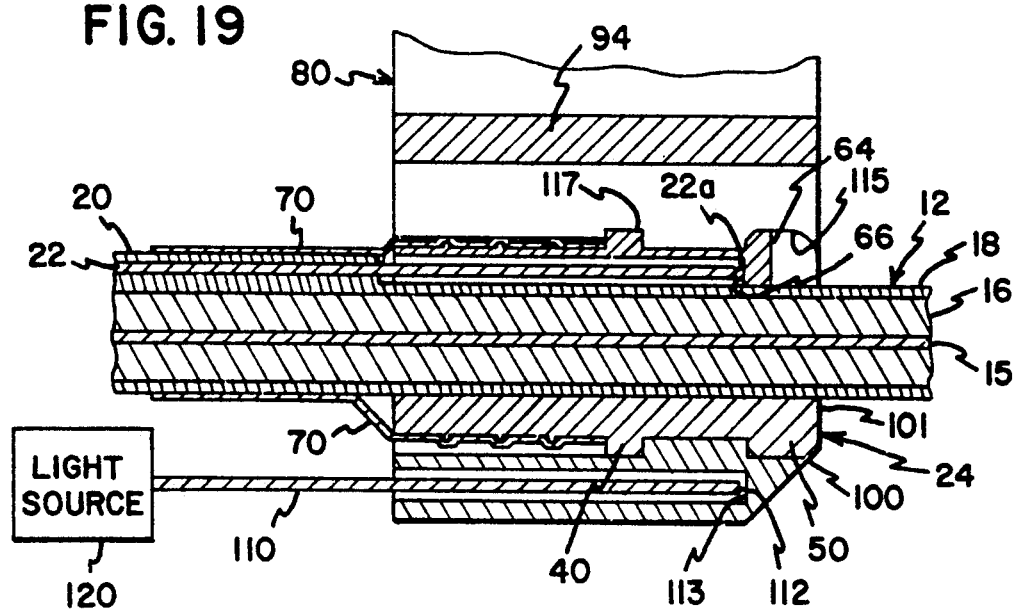
FIG. 19 is a view taken generally along line 19—19 of FIG. 18 with cable elements added.
Figure 17:
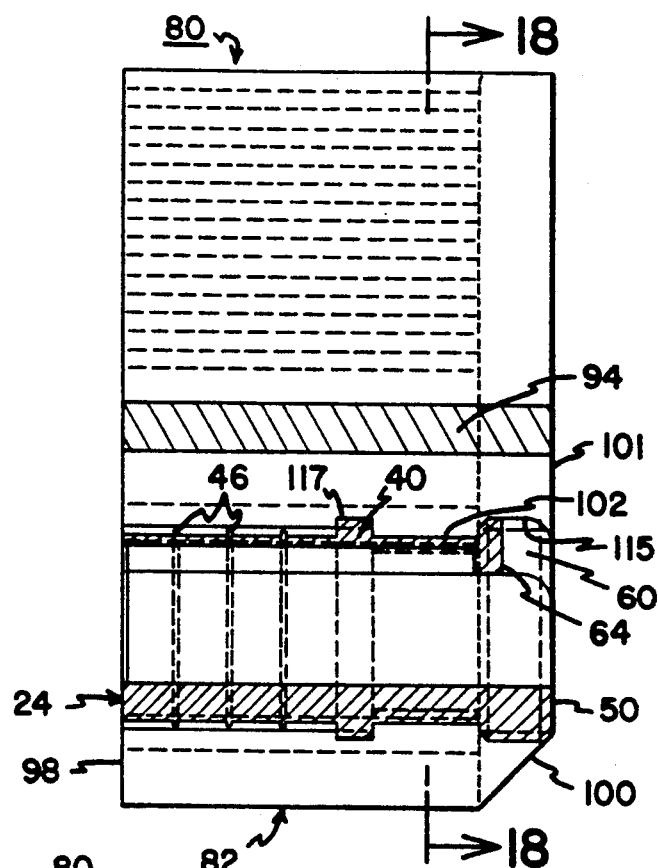
FIG. 17 is a view taken along line 17—17 of FIG. 16.
Figure 18:
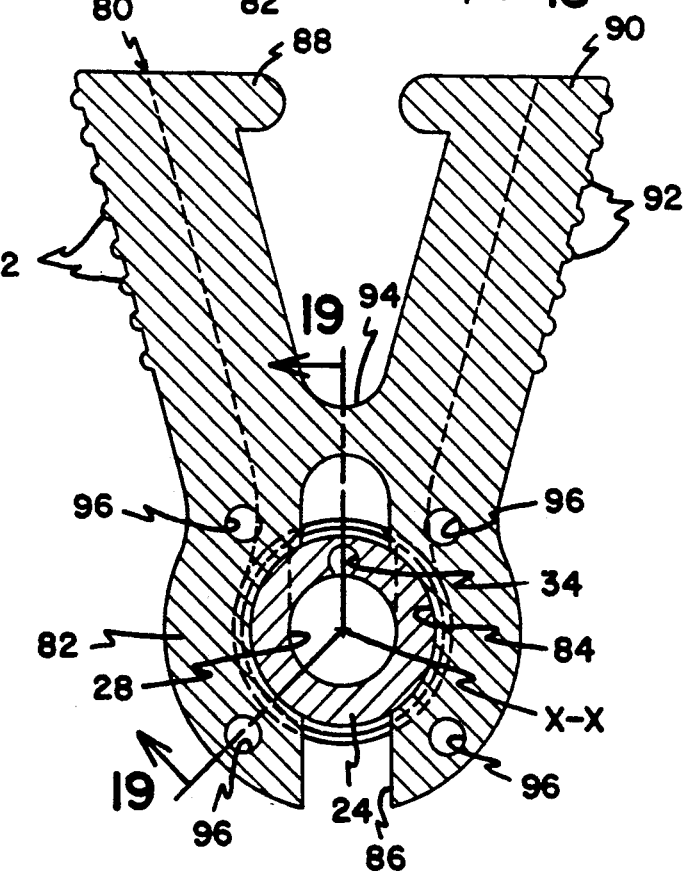
FIG. 18 is a view taken along line 18—18 of FIG. 17.

FIGS. 17 and 18 show the clip 80 attached to a coupling 24. As a result of this structure, when light enters the clip 80 through a fiber 110, the light is reflected radially inwardly by the chamfer 100 and into the ring 50. (For ease of illustration, fiber 110 is not shown in FIGS. 17 or 18 but is shown in FIG. 19). The reader will note that the chamfer 100 radially opposes the ring 50. Accordingly, when light enters into the ring 50, the light reflects off of the surfaces 60, 62 of the ring and projects into a fiber end 22a connected to the coupling 24.

In use, four fibers 110 are received within bores 96. The fibers 110 are all connected to a common light source 120. As a result, in use, a patch cord 10 according to the present invention extends between two pieces of fiber optic equipment. When desiring to trace the connection, a technician places the clip 80 on one of the connection, a technician places the clip 80 on one of the couplings 24. By operating a light source, fibers 110 are illuminated resulting in light passing from the fibers 110 and through light transmission surface 112 and into the clip 80. The light within the clip 80 is directed by the chamfer 110 into ring 50. Light within ring 50 is directed by the reflective surfaces of the ring 50 into the fiber end 22a of secondary fiber 22. The light passes through fiber 22 to the second coupling 24' with the light of the fiber illuminating the ring of the secondary coupling 24'. Accordingly, the technician can visually identify the second end of the patch cord.

Second annular groove 115 receives the ring 50. Accordingly, upon placement of the clip 80 the coupling 24 is accurately aligned with the clip 80 such that the chamfer surface 100 is opposing the ring 50 to ensure an optical coupling between the ring and the chamfer 100. The reader will also note that the clip 80 can be placed onto the coupling 24 in any position around the radius of the coupling.

From the foregoing detailed description of the present invention, it has been shown how the invention has been achieved in a preferred embodiment. However, modifications and equivalents of the disclosed concepts such as those which readily occur to one of ordinary skill in the art are intended to be included within the scope of the present invention. An example of such a modification would include use of a secondary transmission element such as fiber 22 on cables other than optical cables. For example, the present invention could readily be applied to coaxial cable patch cords. Also, a secondary transmission member other than secondary fiber 22 could be utilized. For example, copper wires may extend between couplings 22, 24. In place of ring 50, each of the couplings 24 could have an LED secured to the copper wires. Also, on the bodies of the coupling 24, electrically conductive contacts could be exposed connected to the electrical wires such that a clip having an exposed contact could be connected to the coupling with the exposed contacts of the clip connected to the exposed contacts on the coupling. A battery or other electrical power source could be connected to the coupling to energize the secondary transmission members and illuminate the LED's carried on the couplings.

The foregoing has described a preferred embodiment using an optical fiber or waveguide as a tracer element. It will be appreciated that many different means for providing visual indication other than couplings 24 are possible. For example, rather than having a light illuminating coupling 24 to indicate tracing, a bare optical fiber could be used which is bent back on itself at an end of the patch cord 10. The light transmitted through the fiber will reflect off of the surfaces of the bend causing a visually perceptible glow at the bend.

Figure 20:
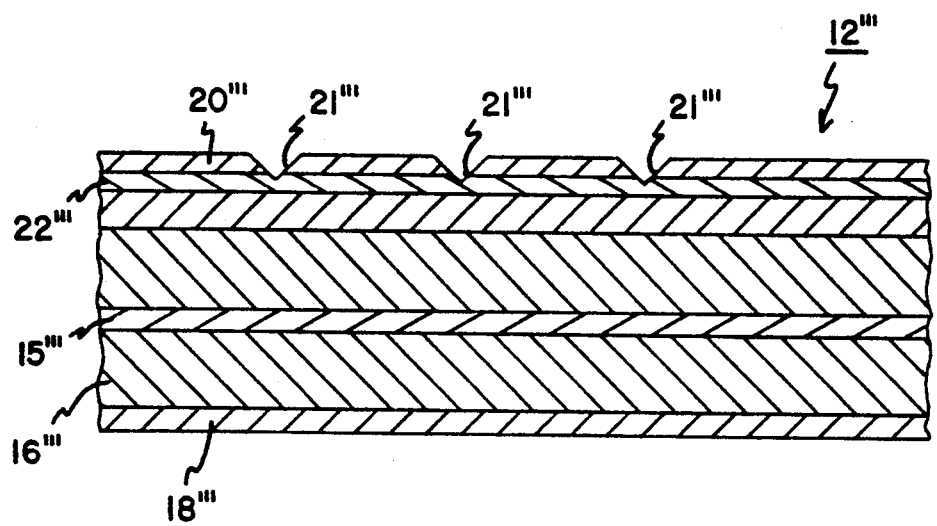
FIG. 20 is a cross-sectional view of an alternative embodiment of the present invention showing an alternative visual indicating mechanism.

Another option is shown in FIG. 20. In FIG. 20, the cable 12''' is shown including a primary transmission element in the form of an optical fiber 15'''' surrounded by a Kevlar fiber 16'''. The sheathing 18''' surrounds the Kevlar 16'''. The sheathing 18''' includes an enlarged portion 20''' which contains a secondary transmission element in the form of an optical fiber 22'''. As an alternative to the embodiment of FIG. 20, the enlargement 20''' could be eliminated and a bare fiber 22''' could simply be secured to the outer sheathing 18''' through any suitable means. A plurality of V-shaped notches 21''' are formed along the length of the cable 12'''' piercing the sheathing 20''' and notching the secondary fiber 22'''. The notches 21''' are attenuation points. Accordingly, when light has passed through secondary fiber 22''', the light reflects off of the surfaces of the notches 21''' to cause a visually perceptible glow at the location of the notches. The notches could be provided at the end of the cable adjacent the cable connectors. Also, the notches 21''' can be provided along the entire length of the cable such that the entire cable will have glowing points to permit a technician to easily trace the cable.

Figure 21:
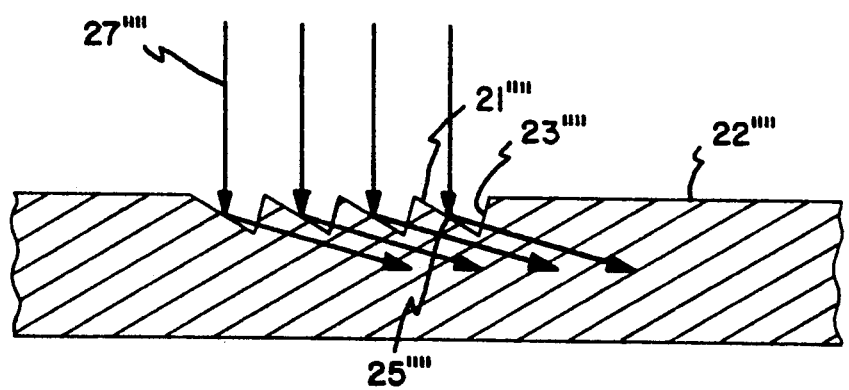
FIG. 21 is an alternative embodiment of the present invention showing an alternative means for passing light into a tracer fiber optic cable.

In addition to using a coupling 24 to inject light into the secondary fiber, the light could be injected into the fiber through numerous means. FIG. 21 shows an alternative embodiment for projecting light into a fiber 22''''. In FIG. 21, a plurality of sawtoothed notches 21'''' are shown. The notches include a surface 23'''' which projects generally radially to the axis of the fiber 22''''. The notches 21'''' also include a surface 25'''' which projects upwardly from surface 23'''' at an acute angle. Accordingly, light rays 27'''' directed generally radially towards fiber 22'''' reflect off of surface 25'''' and pass through surface 23''''. Accordingly, light is injected into the fiber 22'''' simply by projecting the light radially towards the fiber 22'''' in the vicinity of the notches 21''''.

In the foregoing description, the reader will appreciate that to practice the teachings of the present invention, the cable of the patch cord need have only a means at one end for receiving energy, an energy transmission member and a means at a second end for providing a visual indicator activated upon energy being transmitted.

Figure 22:
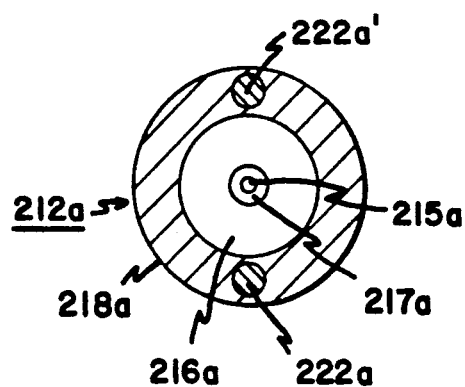
FIGS. 22-27 and 27A are alternative embodiments of a fiber optic cable containing secondary light transmission members.

FIGS. 22-27 and 27A show a variety of alternative embodiments for securing secondary light transmission means to an optical fiber. In each of FIGS. 22-27 and 27A, a cross-section of an optical fiber patch cord cable is shown. In FIG. 22, the cable 212a includes a centrally positioned optical fiber 215a surrounded by a buffer 217a, as is conventional.

Surrounding the buffered fiber are strength members such as Kevlar 216a, as is conventional. An outer PVC jacket 218a surrounds the strengthening member 216a. On diametrically opposed opposite sides of the axis of the cable 212a, two light transmission waveguides or fibers 222a, 222a' are embedded within the cable jacket 218a. In the embodiment of FIG. 22, the waveguides 222a, 222a' are the secondary transmission waveguides which carry the illumination for the tracer function similar to the function of fiber 22 of FIG. 3.

In the embodiments of FIGS. 23-27 and 27A, elements similar to those of FIG. 22 are similarly numbered. However, the distinguishing letter "a" to the element numbers of FIG. 22 are substituted for "b", "c", "d", "e", "f" and "g" in FIGS. 23, 24, 25, 26, 27, and 27A, respectively, to distinguish the embodiments.

Figure 23:
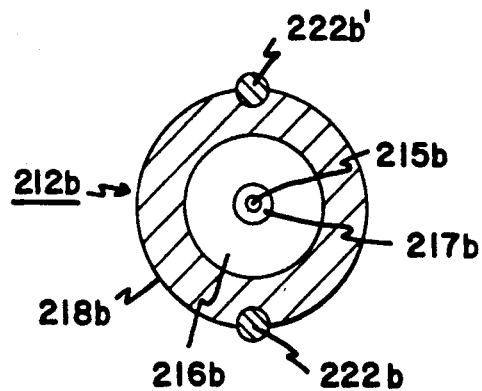
Figure 24:
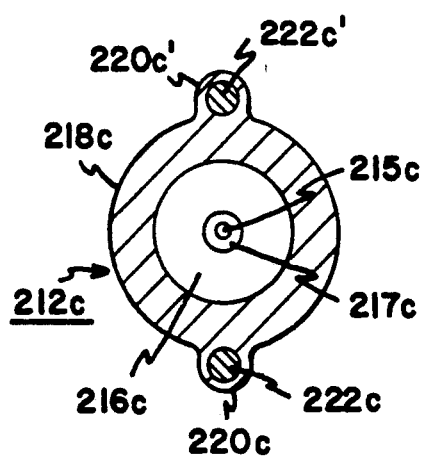

In the embodiment of FIG. 23, the construction of the cable 212b is the same as that of 212a with the exception that the secondary transmission fibers 222b, 222b' are only partially embedded within the outer jacket 218b such that the surfaces of the secondary transmission fibers 222b, 222b' are exposed along the length of the cable. In FIG. 24, the secondary light transmission fibers 222c, 222c' are contained within enlarged areas, 220c, 220c' of the outer jacket 218c.

Figure 25:
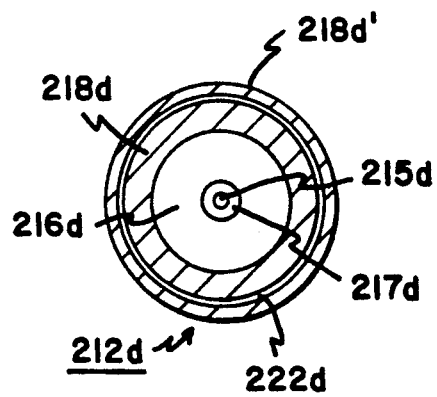

In the embodiment of FIG. 25, the outer jacket contains an inner section 218d surrounded by an outer section 218d'. Sandwiched between sections 218d and 218d' is a cylindrical light transmission layer 222d which is formed of clear flexible plastic such that light can be carried and transmitted through layer 222d.

Figure 26:
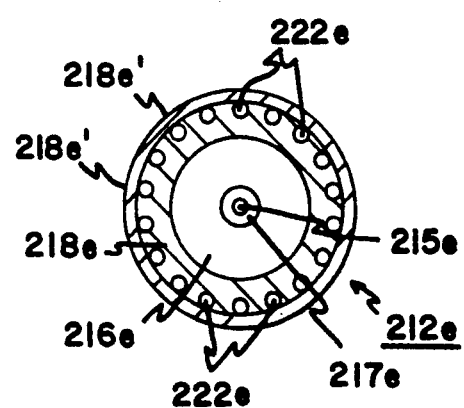
Figure 27:
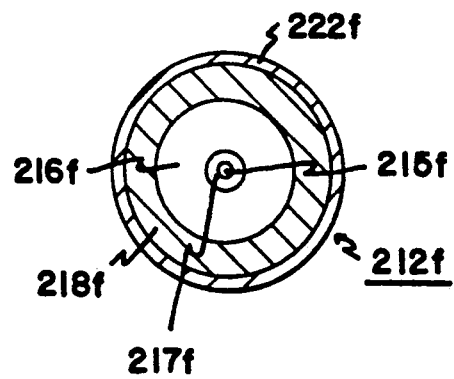

Unlike the embodiment of FIG. 25 which has a cylindrical light transmission layer 222d, the embodiment of FIG. 26 includes a plurality of secondary light FIG. 27 includes a cylindrical clear plastic outer light transmission jacket 222f which surrounds the cable jacket 218f. The light transmission jacket 222f has its outer cylindrical surface completely exposed along the length of the cable.

Figure 27A:
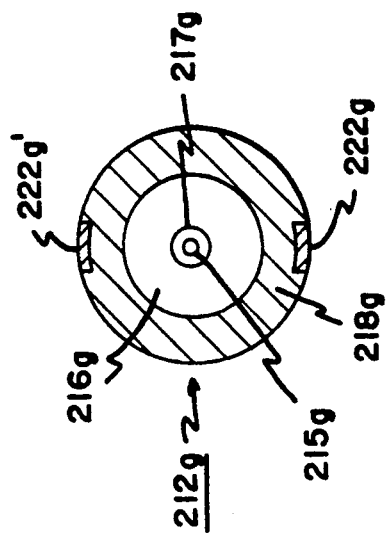

In FIG. 27A, the buffered optical fiber 215g is centrally positioned within the strength members 216g. The PVC sheathing 218g surrounds the strength members. Diametrically opposed optical waveguides 222g, 222g' are directly extruded onto the jacket 218g. So extruded, the waveguides 222g, 222g' are positioned on an outer surface of the jacket such that an outer surface of the waveguides 222g, 222g' are exposed along an entire length of the jacket 218g.

Figure 28:
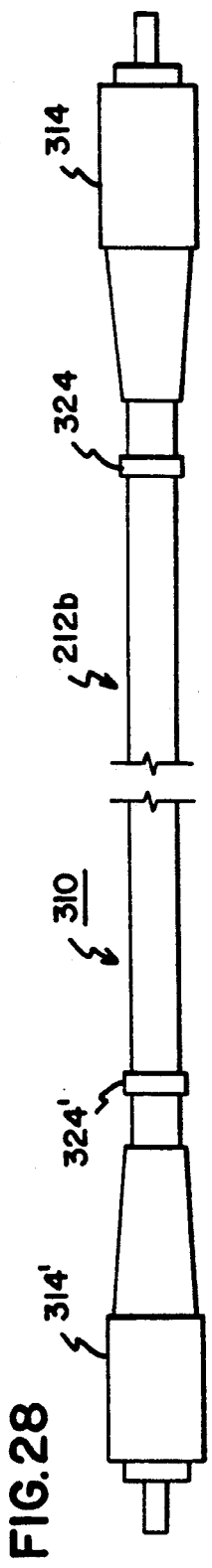
FIG. 28 is an alternative embodiment of a patch cord according to the present invention.

FIGS. 28-33 show alternative embodiments for injecting light into the secondary light transmission members. In FIG. 28, a patch cord 310 is shown including a cable such as cable 212b of FIG. 23. The cable 212b terminates at fiber optic connectors 314, 314'.

Figure 29:
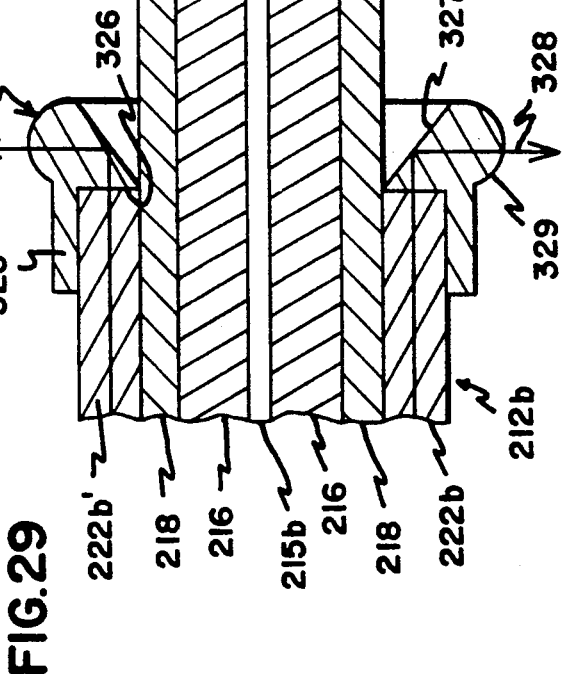
FIG. 29 is a cross-sectional view of an alterative embodiment of a coupling secured to a cable.

Couplings 324, 324' are positioned on the cable 312 adjacent connectors 314, 314'. In FIG. 29, the cable 212b is shown in cross-sectional view with coupling 324.

The coupling 324 includes a collar portion 325 which surrounds the cable 212b. A light transmission surface 326 is provided to be parallel to and abutting the terminal ends of secondary fibers 212b, 212b'. The coupling 324 further includes a light directing surface 327 disposed at about 45° to the surface 326 to receive light rays 328 passing axially through fibers 212b, 212b' with the surface 327 angled to direct the light rays 328 radially outwardly as shown in FIG. 29. Radially opposing surfaces 327, a convex annular surface 329 is provided to focus the light 328 directed off of surface 327.

In FIG. 29, the light is injected into the ends of the fibers 212b, 212b'. Using the teachings of FIG. 21, In FIG. 29, the light is injected into the ends of the fibers 212b, 212b'. Using the teachings of FIG. 21, light can be coupled through the surface of the secondary light transmission fibers. FIGS. 30-33 show a coupling for projecting light into the secondary light transmission members through the surface of the secondary light transmission members. In the embodiments, a cable such as cable 212b is utilized.

Figure 30:
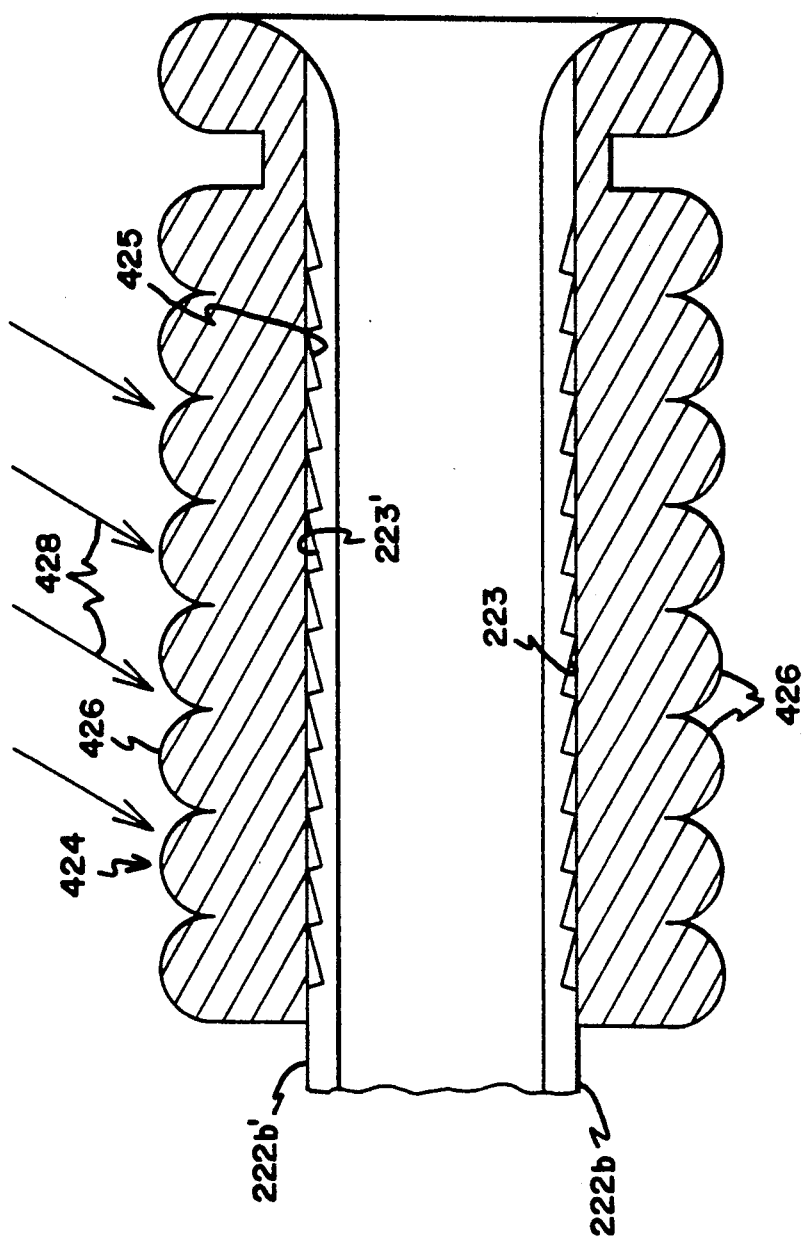
FIG. 30 is a cross-sectional view of an alternative embodiment for focusing light into a secondary light transmission fiber through the surface of the fiber.

In FIG. 30, for purposes of clarity, the entire cable 212b is not shown. Instead, only secondary light transmission fibers 222b and 222b' are shown. The surfaces of fibers 222b, 222b' are provided with the notched surfaces 223, 223' of construction such as that shown in FIG. 21.

A coupling 424 is provided having an inner bore 425 surrounding fibers 222b, 222b'. The coupling 424 is clear plastic and on its radially outer surface includes a plurality of convex rings 426. Preferably, light is projected at the coupling 424 with the light rays 428 extending at an angle to the radius of the coupling 424. The light is focused by the rings 426 to the microprism of the notches 223, 223' and injected into the fibers 222b, 222b'.

Figure 31:
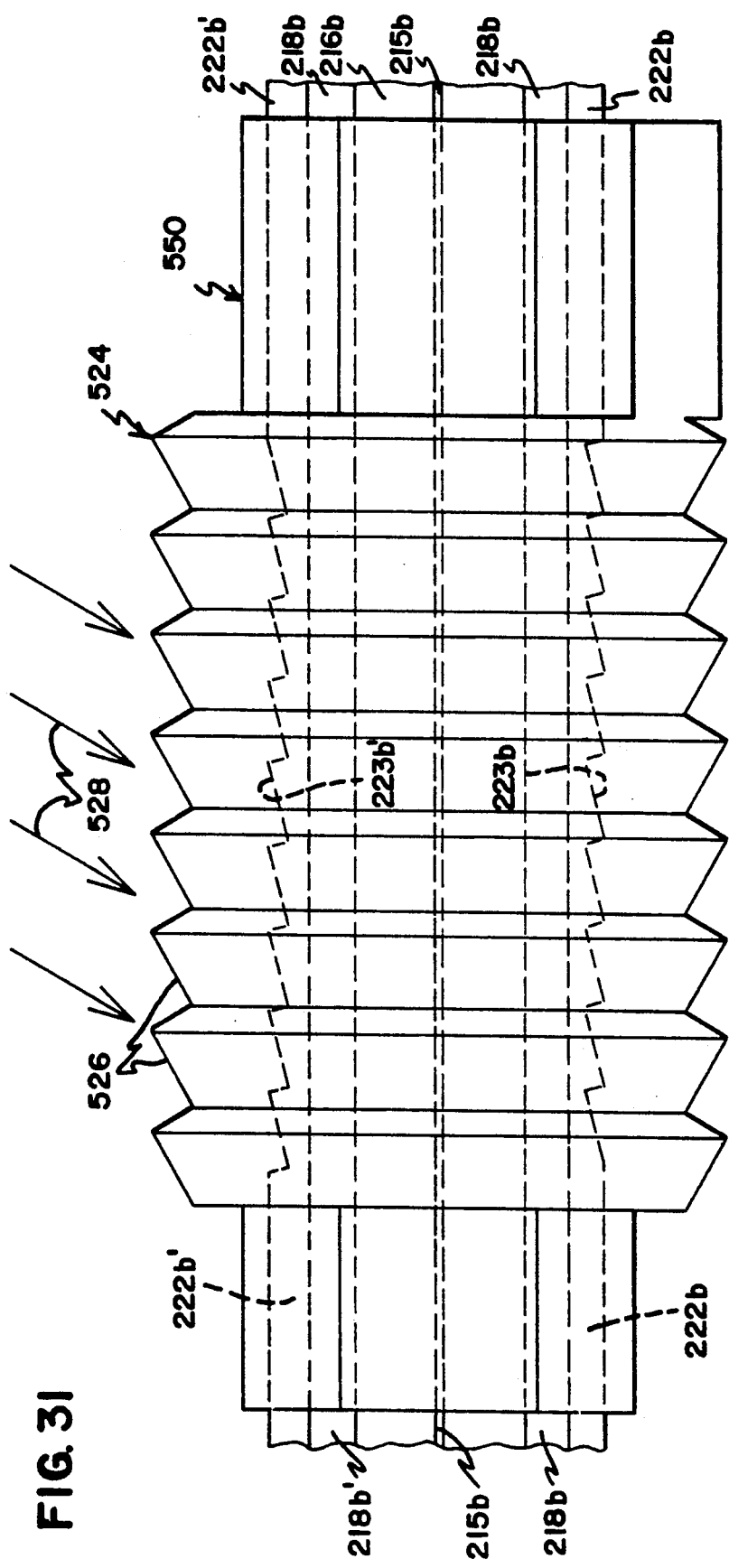
FIG. 31 is an alternative embodiment of the view of FIG. 30.

In FIG. 31, an alternative embodiment is shown utilizing a fiber having the construction of FIG. 23. A coupling 524, similar to coupling 424 of FIG. 30, is provided. Coupling 524 does not included convex rings. Instead, the rings 526 of coupling 524 are generally triangular in cross section to provide a more enhanced prismatic effect for projecting light rays 528 toward the microprism of notches 223b, 223b' of fiber 222b, 222b'.

Figure 32:
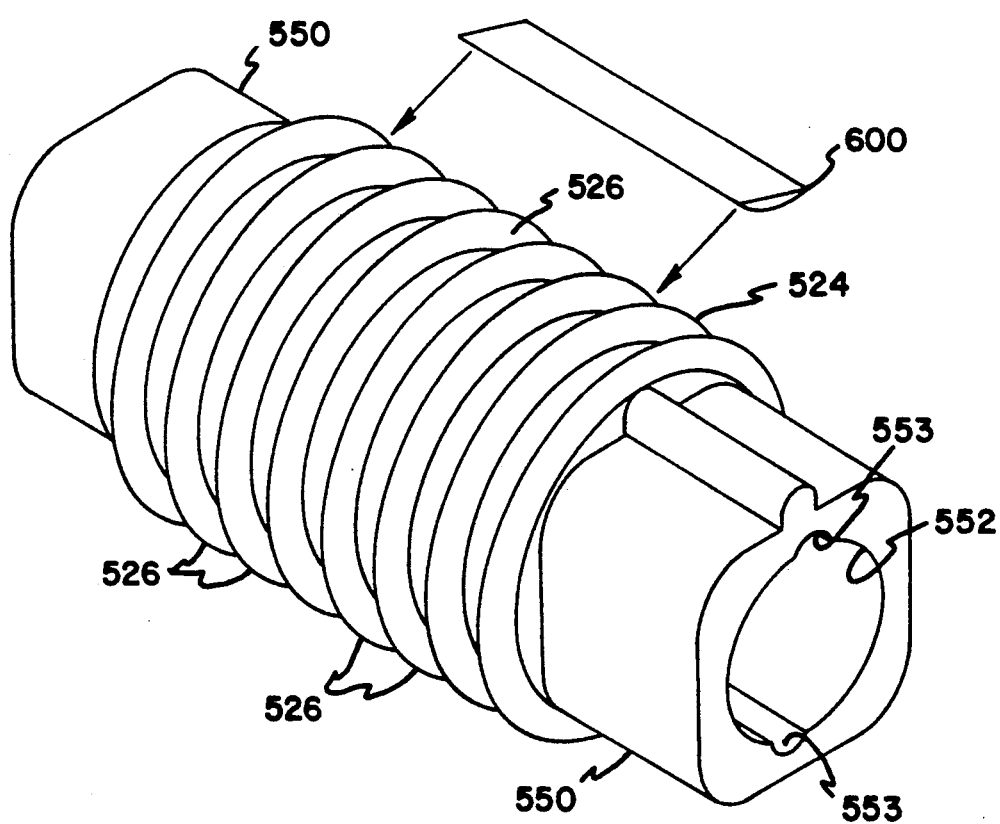
FIG. 32 is a prospective view of a self orientation block for securing the embodiment of FIG. 31 to a cable.

FIG. 32 shows a self orientation block 550 cylindrically formed with coupling 524. The block 550 includes a bore 552 extending therethrough sized to receive a cable. Block 550 is shown for use with the embodiment of FIG. 23 and includes diametrically opposed secondary bores 553 sized to receive and retain fibers 222b, 222b'. Accordingly, with the cable 212b passed through block 550, the cable and the block do not rotate relative to one another. Also, for use with a clip, for example, a clip having the function of clip 80 of FIG. 19, it is preferred that such a clip will be provided with a cylindrical lens 600 having its longitudinal axis generally perpendicular to the rings 526. The cylindrical lens will focus light from a source into the rings 526.

We claim:

1. A patch cord comprising:
   a cable having a primary transmission member for carrying a primary signal, said cable extending from a first cable end to a second cable end;
   secondary transmission means for carrying a tracing signal and secured to said cable for movement therewith and extending from a first end proximate said first cable end to a second end proximate said second cable end;
   a first connector secured to a first end of said primary transmission member at said first cable end for connection of said first end to a first telecommunications equipment;
   a second connector secured to a second end of said primary transmission member at said second cable end for connection of said second end to a second telecommunications equipment;
   first means carried on said cable for movement therewith upon disconnection of said first and second connections from said first and second telecommunications equipment, respectively, and connected to said second end of said secondary transmission means for receiving said energy from said secondary transmission means and generating a sensible signal in response to receiving said energy;
   whereby said tracing signal is transmitted along said secondary energy transmission means from said first means and generates said sensible signal at said second means to permit tracing of said cable.

2. A patch cord according to claim 1 comprising first and second couplings connected to said first and second ends, respectively, of said secondary transmission means with each of said first and second couplings, including respective ones of said first means and each includes respective ones of said second means.

3. A patch cord according to claim 2 wherein said first coupling includes at least a first light transmitting portion disposed to receive light from an external source and direct said light into said optical waveguide.

4. A patch cord according to claim 2 wherein said second coupling includes at least a second light transmitting portion disposed to receive light from said optical waveguide.

5. A patch cord according to claim 4 wherein said second coupling further includes a surface to direct light received from said optical waveguide.

6. A patch cord according to claim 2 wherein said secondary transmission means is an optical waveguide.

7. A patch cord according to claim 6 wherein said first coupling includes at least a light transmitting portion disposed to receive light from an external source and direct light into said optical waveguide.

8. A patch cord according to claim 6 wherein said second coupling includes at least a first light transmitting portion disposed to receive light from said optical waveguide.

9. A patch cord according to claim 8 wherein said second coupling further includes a surface to direct light received from said optical waveguide.

10. A patch cord according to claim 1 wherein said secondary transmission means is an optical waveguide.

11. A patch cord according to claim 10 wherein said optical waveguide is secured to said sheath.

12. A patch cord comprising:
    a cable having a primary transmission member and a protective sheathing, said cable extending from a first cable end to a second cable end;
    energy transmission means carried on said cable and extending from a first end proximate said first cable end to a second end proximate said second cable end;
    a first connector secured to a first end of said primary transmission member at said first cable end;
    a second connector secured to a second end of said primary transmission member at said second cable end;
    first means connected to said first end of said energy transmission means for receiving energy from an external source and transmitting said energy along said energy transmission means;
    second means connected to said second end of said energy transmission means for receiving said energy from said energy transmission means and generating a visible signal in response to receiving said energy;
    first and second couplings connected to said first and second ends, respectively, of said energy transmission means with each of said first and second couplings, including respective ones of said first means and each includes respective ones of said second means;
    said second coupling including at least a second light transmitting portion disposed to receive light from said optical waveguide;
    said second coupling further including a surface to direct light received from said optical waveguide; and
    said second light transmitting portion including an annular ring with said surface carried on said ring and disposed to direct light into said ring to illuminate said ring.

13. A patch cord comprising:

a cable having a primary transmission member and a protective sheathing, said cable extending from a first cable end to a second cable end;

energy transmission means carried on said cable and extending from a first end proximate said first cable end to a second end proximate said second cable end;

a first connector secured to a first end of said primary transmission member at said first cable end;

a second connector secured to a second end of said primary transmission member at said second cable end;

first means connected to said first end of said energy transmission means for receiving energy from an external source and transmitting said energy along said energy transmission means;

second means connected to said second end of said energy transmission means for receiving said energy from said energy transmission means and generating a visible signal in response to receiving said energy;

first and second couplings connected to said first and second ends, respectively, of said energy transmission means with each of said first and second couplings, including respective ones of said first means and each includes respective ones of said second means;

said energy transmission means is an optical waveguide;

said second coupling includes at least a first light transmitting portion disposed to receive light from said optical waveguide; and said light transmitting portion including an annular ring with said surface disposed to direct light into said ring to illuminate said ring.

14. A patch cord comprising:

a cable having a primary transmission member and a protective sheathing, said cable extending from a first cable end to a second cable end;

energy transmission means carried on said cable and extending from a first end proximate said first cable end to a second end proximate said second cable end;

a first connector secured to a first end of said primary transmission member at said first cable end;

a second connector secured to a second end of said primary transmission member at said second cable end;

first means connected to said first end of said energy transmission means for receiving energy from an external source and transmitting said energy along said energy transmission means;

second means connected to said second end of said energy transmission means for receiving said energy from said energy transmission means and generating a visible signal in response to receiving said energy;

first and second couplings connected to said first and second ends, respectively, of said energy transmission means with each of said first and second couplings, including respective ones of said first means and each includes respective ones of said second means; and a clip having means for releasably connecting said clip to said first coupling;

at least a first source optical fiber carried by said clip and connected to a light source;

said first source optical fiber having a light transmitting end disposed to be optically coupled with said second means of said coupling.

15. A patch cord according to claim 14 wherein said clip includes at least a transparent portion including said light receiving surface, said transparent portion further including a light emitting surface optically coupled with said first means.

16. A patch cord according to claim 15 wherein said clip includes a reflective surface disposed between said light transmitting end of said first source optical fiber and said lighting emitting surface for light from said fiber to reflect off said reflective surface and through said light emitting surface, said clip and said coupling mutually sized for said clip to be secured to said coupling with said light emitting surface opposing a light receiving surface of said second coupling with said second coupling having a reflective surface for directing light from said light receiving surface toward said energy transmission means.

17. A patch cord comprising:

a cable having a primary transmission member and a protective sheathing, said cable extending from a first cable end to a second cable end;

energy transmission means carried on said cable and extending from a first end proximate said first cable end to a second end proximate said second cable end;

a first connector secured to a first end of said primary transmission member at said first cable end;

a second connector secured to a second end of said primary transmission member at said second cable end;

first means connected to said first end of said energy transmission means for receiving energy from an external source and transmitting said energy along said energy transmission means;

second means connected to said second end of said energy transmission means for receiving said energy from said energy transmission means and generating a visible signal in response to receiving said energy;

first and second couplings connected to said first and second ends, respectively, of said energy transmission means with each of said first and second couplings, including respective ones of said first means and each includes respective ones of said second means; and each of said first and second couplings including light transparent material with said first and second ends secured to each of said first and second couplings, respectively, with each of said first and second couplings having a light transparent surface optically coupled to said first and second ends, respectively, each of said couplings further having a second light transparent surface, each of said couplings having a light reflective surface disposed between said first and second light transparent surfaces, respectively.

18. A patch cord according to claim 17 comprising a clip having means for securing said clip to either of said first and second couplings, respectively, said clip including first and second light transmission surfaces, said first light transmission surface optically coupled to said light transmission surfaces of said coupling when said clip is secured to said coupling, an optical fiber carried by said clip and having a light transmitting end optically coupled with said second transmission surface, said clip having reflective surfaces for reflecting light within said clip between said first and second transmission surfaces.

19. A patch cord according to claim 18 comprising an energy source, means for releasably securing said clip to said first said coupling with said energy source connected to said first means for receiving energy from an external source.

20. A patch cord comprising:
a cable having a primary transmission member and a protective sheathing, said cable extending from a first cable end to a second cable end;
energy transmission means carried on said cable and extending from a first end proximate said first cable end to a second end proximate said second cable end;
a first connector secured to a first end of said primary transmission member at said first cable end;
a second connector secured to a second end of said primary transmission member at said second cable end;
first means connected to said first end of said energy transmission means for receiving energy from an external source and transmitting said energy along said energy transmission means;
second means connected to said second end of said energy transmission means for receiving said energy from said energy transmission means and generating a visible signal in response to receiving said energy; and
said second means includes at least one attenuation point disposed on said energy transmission means to emit at least a portion of said energy as said visible signal in response to energy carried by said energy transmission means.

21. A patch cord according to claim 20 wherein said energy transmission means is an optical fiber and said attenuation point is a notch formed in said fiber having a reflective surface to reflect light from said fiber to an exterior of said fiber.

22. A patch cord according to claim 21 comprising a plurality of said notches formed along a length of said fiber.

23. A patch cord comprising:
a cable having a primary transmission member and a protective sheathing, said cable extending from a first cable end to a second cable end;
energy transmission means carried on said cable and extending from a first end proximate said first cable end to a second end proximate said second cable end;
a first connector secured to a first end of said primary transmission member at said first cable end;
a second connector secured to a second end of said primary transmission member at said second cable end;
first means connected to said first end of said energy transmission means for receiving energy from an external source and transmitting said energy along said energy transmission means;
second means connected to said second end of said energy transmission means for receiving said energy from said energy transmission means and generating a visible signal in response to receiving said energy; and
said energy transmission means is an optical fiber and said first means includes a plurality of reflective surfaces formed on said fiber and disposed to receive light from an external source and reflect said light into said fiber.

24. A patch cord for interconnecting a first telecommunications equipment and a second telecommunication equipment, said patch cord comprising:
a cable having a primary transmission member for carrying a primary signal, said cable extending from a first cable end to a second cable end;
a first connector secured to a first end of said primary transmission member at said first cable end for connecting said first end of said primary transmission member to said first telecommunication equipment;
a second connector secured to a second end of said primary transmission member at said second cable end for connecting said second end of said primary transmission member to said second telecommunications equipment;
first signal receiving means carried on said cable proximate said first cable end for receiving a tracing signal from an external source with said first signal receiving means secured to said cable for movement therewith upon disconnection of said first and second connectors from said first and second telecommunications equipment, respectively; and
first signal emitting means carried on said cable for movement therewith proximate said second cable end and connected to said first signal receiving means for emitting a perceptible signal upon receipt of said tracing signal by said first signal receiving means from said external source.

25. A patch cord according to claim 24 comprising second signal receiving means carried on said cable proximate said second cable end for receiving a signal from an external source with said second signal receiving means secured to said cable for movement therewith upon disconnection of said first and second connectors from said first and second telecommunications equipment, respectively, and
second signal emitting means carried on said cable proximate said first end and connected to said second signal receiving means for emitting a perceptible signal upon receipt of said signal by said second signal receiving means from said external source.

26. A patch cord according to claim 25 comprising a first racer component which includes said first signal receiving means and said second signal emitting means and a second tracer component which includes said second signal receiving means and said first signal emitting means.

27. A traceable signal transmission member for interconnecting a first telecommunications equipment with a second telecommunications equipment, said member comprising:
a primary signal carrier extending from a first end to a second end for transmission of a primary telecommunications signal from said first end to said second end;
a first connector secured to said first end for releasably connecting said first end to said first telecommunications equipment;
a second connector secured to said second end for releasably connecting said second end to said second telecommunications equipment;
a secondary signal carrier for transmission of a secondary signal and attached to said primary signal carrier for movement therewith upon disconnection of said first and second connectors from said first and second telecommunications equipment, respectively;

signal generating means connected to said secondary signal carrier for generating a tracing signal and transmitting said tracing signal along said secondary signal carrier, said signal generating means secured to said primary signal carrier for movement therewith upon disconnection of said first and second connectors from said first and second telecommunications equipment, respectively; and signal emitting means connected to said secondary signal carrier for receiving said tracing signal from said secondary signal carrier and generating an operator discernable signal in response to said tracing signal, said signal emitting means secured to said primary signal carrier for movement therewith upon disconnection of said first and second connectors from said first and second telecommunication equipment, respectively.

28. A signal transmission member according to claim 27 wherein said signal generating means includes means for receiving a signal from an external source and generating said tracing signal in response thereto.

29. A signal transmission member according to claim 27 wherein said signal emitting means includes means for generating a tracing signal and transmitting said tracing signal along said secondary signal carrier and wherein said signal generating means includes means for receiving, from said secondary signal carrier, said signal generated by said signal emitting means and generating an operator discernable signal in response thereto.

* * * * *

UNITED STATES PATENT AND TRADEMARK OFFICE
CERTIFICATE OF CORRECTION

PATENT NO. : 5,305,405

DATED : April 19, 1994

INVENTOR(S) : David J. Emmons et al.

It is certified that error appears in the above-identified patent and that said Letters Patent is hereby corrected as shown below:

Column 3, line 3, "alterative" should read --alternative--.

Column 6, line 16, "connection" should read --connections--.

Column 8, line 20, insert --.-- after the word "light".

Column 8, line 55, delete "In FIG. 29, the light is injected into the ends of the fibers 212b, 212b'. Using the teachings of FIG. 21," after the numeral "327".

Column 12, line 67, "coupling" should read --couplings--.

Column 14, lines 5 and 6, "telecommunication" should read --telecommunications--.

Column 14, line 13, "telecommunication" should read --telecommunications--.

Column 14, line 48, "racer" should read --tracer--.

UNITED STATES PATENT AND TRADEMARK OFFICE
CERTIFICATE OF CORRECTION

PATENT NO. : 5,305,405

DATED : April 19, 1994

INVENTOR(S) : David J. Emmons et al

It is certified that error appears in the above-indentified patent and that said Letters Patent is hereby corrected as shown below:

Column 16, line 2, "telecommunication" should read --telecomminications--.

Signed and Sealed this

Twentieth Day of September, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   :   5,305,405

DATED        :   April 19, 1994

INVENTOR(S)  :   David J. Emmons et al.

It is certified that error appears in the above-identified patent and that said Letters Patent is hereby corrected as shown below:

Column 9, line 56, after "and connected to said", insert --first end of said secondary transmission means for receiving said tracing signal from an external source and transmitting said tracing signal along said secondary transmission means to said second end of said secondary transmission means;

second means carried on said cable for movement therewith upon disconnection of said first and second connections from said first and second telecommunications equipment, respectively, and connected to said --

Signed and Sealed this

Ninth Day of January, 1996

Attest:

BRUCE LEHMAN

Attesting Officer

*Commissioner of Patents and Trademarks*